March 27, 1951
H. PFAU
2,546,834
COMBINATION BED AND SEAT EQUIPMENT
FOR AUTOMOBILES
Filed Feb. 14, 1948
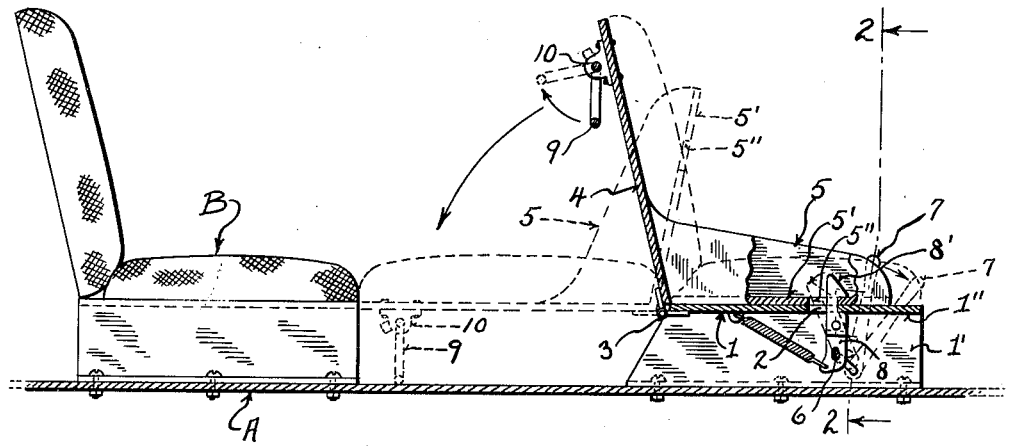
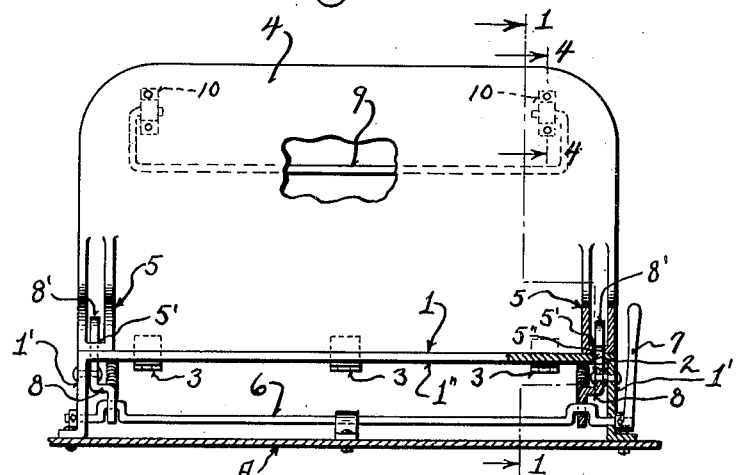
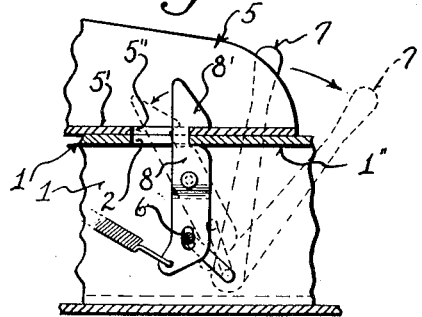
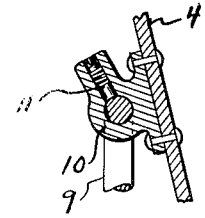
INVENTOR
HARRY PFAU
BY
ATTORNEYS Patented Mar. 27, 1951

2,546,834

UNITED STATES PATENT OFFICE 2,546,834

COMBINATION BED AND SEAT EQUIPMENT FOR AUTOMOBILES

Harry Pfau, Kenosha, Wis.

Application February 14, 1948, Serial No. 8,383

1 Claim. (Cl. 155—7)

My invention refers to automobile seats and it has for its primary object to provide a simple and comfortable bed, by employing a lock and release mechanism for the hinged cushioned back of the front seat. The cushioned back of the front seat is provided with skeleton arms extending forwardly, having web sections, adapted to rest upon the seat frame for engagement with a pair of lock and release dogs, whereby when the seat back is released and the same may be folded rearwardly in alignment with the back seat cushion to convert the vehicle seats into a composite bed mattress.

With the above and other objects in view, which will appear as the description proceeds, the invention resides in the novel construction, combination and arrangement of parts, substantially as hereinafter described, and more particularly defined by the appended claim, it being understood that such changes in the precise embodiment of the herein disclosed invention may be made as come within the scope of the claim.

In the accompanying drawings is illustrated one complete example of the physical embodiment of the present invention constructed according to the best mode so far devised for the practical application of the principles thereof.

In the drawings:

Figure 1 represents a side elevation of a pair of vehicle seats embodying the features of my invention, the same being partly in section, as indicated by line 1—1 of Figure 2.

Figure 2, a cross sectional view of the front seat mechanism, the section being indicated by line 2—2 of Figure 1.

Figure 3, a fragmentary enlarged sectional view of the seat lock and release mechanism, and Figure 4, a detailed cross sectional view through a journal of the garment supporting rod associated with the back frame of the front seat.

Referring by characters to the drawings, A indicates the floor of a standard automobile vehicle, having secured thereto a rear seat B. The front seat is mounted upon a seat supporting frame 1, having depending side walls 1', which walls are secured to the floor A, the upper wall 1'' of said support, being provided with slots 2, the purpose of which will be hereinafter described.

A series of hinges 3, are secured to the rear edge of the supporting frame 1, and said hinges are connected to the lower edge of a metallic back 4, which back and seat, as indicated in dotted lines, Figure 1, are each provided with a usual upholstery. The upholstered metallic back 4, is provided with forwardly extended skeleton arm rests 5, which arm rests are U-shaped in cross section, having a web base 5' that is provided with slots 5'' in alignment with the slots of the seat supporting frame 1.

A crank-shaft 6 is journaled in the side walls 1' of the supporting frame, and one end of said shaft, is provided with a manual controlling lever 7, which lever is conveniently positioned to one side of the front seat for proper manipulation. It should be understood that the metallic skeleton arms are provided with the usual upholstery not shown.

A pair of lock and release dogs 8, are pivotally secured to the side walls of the seat supporting frame, and the upper ends of these dogs are provided with beveled heads 8', that project through the slots in the seat supporting frame and base web 5' of the arms 5, as clearly illustrated in Figures 1 to 3 inclusive of the drawings.

The garment hanger bar 9 is of usual construction and is pivoted to ears 10, secured to the back frame 4. This hanger is arranged to serve as a supporting leg for the front upholstered back-support, and as indicated in dotted lines in Figure 1, when the back-support is folded downwardly to completely a bed mattress, the hanger rod 9 is shifted in its bearings, whereby it is utilized as a leg to support said back when the same is in its bed position. In order to prevent the leg from movement, I provide a spring plunger 11, mounted in one of the pivot ears of the rod 10. Hence, when said rod is positioned to serve as a leg, it is locked in said position by the spring plunger.

In developing my invention, I had particularly in mind, to provide a simple means for converting the seats of a standard structure and said conversion is a combination bed structure, in effect, by simply providing a hinge connection between the back frame 4 and the seat supporting frame 1. In addition to this simple connection, I also by a slight alteration and arrangement, may assemble the proper lock and release dog mechanism without material cost, keeping in mind a standard seat construction now in general use.

When the front seat is equipped with my invention, it is apparent that by simply unlocking the hand lever 7, the back frame of the seat is released, in conjunction with its arms from the seat supporting frame and thereafter, the said back is folded down, as indicated in dotted lines, Figure 1, to complete the mattress of a bed, which mattress comprises the upholstered front and rear seats and the upholstered front seat back, all of which are in a uniform line.

It will be noted that the back and extended arms form in effect a bell crank lever and that the ends of said arms are locked to the seat, whereby, due to this leverage, load strain upon the back is relieved. It will also be understood that when the back 4 of the front seat is folded down to form a bed, the integral base 5 of the back serves as a foot rest, as indicated in dotted lines, Figure 1.

I claim:

A combination seat and bed for automobiles comprising a skeleton seat supporting frame, having a top wall and side walls, the top wall being slotted adjacent to the side walls, the front seat including a back and base extending at approximately a right angle to each other, the intersecting corner of the back and base being in hinged connection with the rear edge of the supporting frame, the front portion of the seat base being slotted in alignment with the supporting frame slots, a pair of beveled head dogs pivotally connected to the supporting frame side walls and extending through the slots of said supporting frame, coil springs connecting the tail ends of the dogs and seating support frames, a crank shaft journaled in the side walls of the seat supporting frame having the crank portions extended through the tail end of said dogs, an actuating lever carried at one end of the crank shaft, whereby the dogs are released from engagement with the base of the front seat, whereby the back of the seat is swung in alignment with the rear seat and the base of said seat forms a foot board.

HARRY PFAU.

REFERENCES CITED

The following references are of record in the file of this patent:

UNITED STATES PATENTS

| Number | Name | Date |
| --- | --- | --- |
| 1,535,494 | Puschel | Apr. 28, 1925 |
| 1,957,004 | Smith | May 1, 1934 |
| 2,006,506 | Lindsey | July 2, 1935 |